(12) United States Patent
Peters

(10) Patent No.: US 10,405,529 B2
(45) Date of Patent: Sep. 10, 2019

(54) HOOK WITH ENCAPSULATED BREAKAWAY JOINT MECHANISM

(71) Applicant: Samuel M. Peters, Savannah, GA (US)

(72) Inventor: Samuel M. Peters, Savannah, GA (US)

(*) Notice: Subject to any disclaimer, the term of this patent is extended or adjusted under 35 U.S.C. 154(b) by 210 days.

(21) Appl. No.: 15/785,939

(22) Filed: Oct. 17, 2017

(65) Prior Publication Data

US 2018/0103621 A1    Apr. 19, 2018

Related U.S. Application Data

(60) Provisional application No. 62/409,474, filed on Oct. 18, 2016.

(51) Int. Cl.
  *A01K 83/00*    (2006.01)
(52) U.S. Cl.
  CPC .................... *A01K 83/00* (2013.01)
(58) Field of Classification Search
  CPC .......... A01K 83/02; A01K 83/04; B21F 45/12
  See application file for complete search history.

(56) References Cited

U.S. PATENT DOCUMENTS

| | | | | |
|---|---|---|---|---|
| 2,526,288 A * | 10/1950 | Shields | ................. | A01K 83/02 43/36 |
| 4,126,957 A * | 11/1978 | Randall | ................. | A01K 83/00 43/43.16 |
| 5,528,850 A * | 6/1996 | Lindstrom | ............. | A01K 83/00 43/4.5 |
| 5,884,428 A * | 3/1999 | Shelton | ................. | A01K 83/00 43/4.5 |
| 2013/0067794 A1* | 3/2013 | Hunter | ................... | A01K 83/00 43/44.81 |
| 2014/0290118 A1* | 10/2014 | Crain | .................... | A01K 83/00 43/42.31 |
| 2015/0208624 A1* | 7/2015 | Krohn | .................... | A01K 85/00 43/42.49 |

* cited by examiner

*Primary Examiner* — Richard G Davis
(74) *Attorney, Agent, or Firm* — Nixon & Vanderhye P.C.

(57) ABSTRACT

A fish hook includes a breakaway clip that initially disables a universal pivot joint. When a fish is hooked, if a pivot force on the universal pivot joint exceeds a predetermined pivot force, the breakaway clip is detached from the hook thereby enabling the universal pivot joint. The resulting amount of force on the hook shaft is reduced by reducing the size of the lever arm, which thereby reduces the likelihood that the hook will be detached from the fish.

15 Claims, 3 Drawing Sheets

HOOK WITH ENCAPSULATED BREAKAWAY JOINT MECHANISM

CROSS-REFERENCES TO RELATED APPLICATIONS

This application claims the benefit of U.S. Provisional Patent Application No. 62/409,474, filed Oct. 18, 2016, the entire content of which is herein incorporated by reference.

STATEMENT REGARDING FEDERALLY SPONSORED RESEARCH OR DEVELOPMENT (Not Applicable)

BACKGROUND

The invention relates to fish hooks and, more particularly, to a fish hook incorporating an encapsulated breakaway joint/swivel mechanism to prevent the hook from being levered out of a fish.

When a fish is hooked, the hook is generally firmly embedded in the mouth or body of the fish, and the hook barb prevents the hook from detaching. As the angler draws the line to retrieve the fish, by virtue of the shape of the hook, the hook shaft/shank acts as a lever relative to the hook portion and barb of the hook. In some orientations, the force by the line acting through the hook as a lever is so great to cause the hook to detach from the fish.

It would be desirable for a hook to react to excessive forces resulting from particular orientations of the hook relative to the line to prevent the hook from detaching when reeling in a fish.

BRIEF SUMMARY

The hook assembly of the described embodiments is a multi-part assembly that is configured to break at a pivot joint/swivel point if the lever force acting on the hook exceeds a preset force. A breakaway clip assembly disables the pivot joint in use until the preset pivot force is applied to the joint. Once the clip assembly breaks away, the amount of force on the hook shaft is reduced by reducing the size of the lever arm, thereby reducing the likelihood that the hook will be detached from the fish.

In an exemplary embodiment, a fish hook includes an eye section including an eye and a shank, a hook section including a bend and a point, and a universal pivot joint connecting the eye section and the hook section such that the hook section is pivotable in multiple planes relative to the eye section. A breakaway clip acts between the eye section and the hook section and disables the universal pivot joint. The breakaway clip may include an inside piece removably positionable over at least a portion of the eye section, the universal pivot joint, and at least a portion of the hook section, and an outside piece releasably engageable with the inside piece. In this context, the outside piece may engage the inside piece in a snap fit.

The universal pivot joint may include a connecting bar with a hook end pivotably connected to the hook section and an eye end pivotably connected to the eye section. An aperture may be provided through each of the hook end and the eye end of the connecting bar, and a connecting ring may be disposed in each of the hook end aperture and the eye end aperture. The eye section may include a first aperture through an end thereof opposite the eye, and the hook section may include a second aperture through an end thereof opposite the point. The connecting ring in the eye end aperture may be disposed in the first aperture of the eye section, and the connecting ring in the hook end aperture may be disposed in the second aperture of the hook section. In this context, the breakaway clip is positionable over the connecting rings.

In another exemplary embodiment, a fish hook includes a first section, a middle section, and a last section, where the first section is pivotably connected to the middle section, and where the middle section is pivotably connected to the last section. A breakaway clip acts across the first section, the middle section and the last section and temporarily prevents the first, middle and last sections from pivoting relative to one another. The breakaway clip may be configured to prevent the first, middle and last sections from pivoting relative to one another up to a predetermined pivot force between the first section and the middle section or between the middle section and the last section. The breakaway clip may be configured to separate from the first, middle and last sections when the predetermined pivot force is exceeded.

The first section of the hook may be connected to the middle section with a first connecting ring, and the middle section may be connected to the last section with a second connecting ring. In this context, the breakaway clip may be positioned over the first and second connecting rings.

In yet another exemplary embodiment, a method of assembling a fish hook includes the steps of (a) connecting an eye section including an eye and a shank to one end of a universal pivot joint; (b) connecting a hook section including a bend and a point to an opposite end of the universal pivot joint; and (c) disabling the universal pivot joint by attaching a breakaway clip across the eye section and the hook section. Step (c) may include removably positioning an inside piece of the breakaway clip over at least a portion of the eye section, the universal pivot joint, and at least a portion of the hook section, and releasably engaging an outside piece of the breakaway clip with the inside piece. The step of releasably engaging the outside piece with the inside piece may include snapping the outside piece into engagement with the inside piece.

BRIEF DESCRIPTION OF THE DRAWINGS

These and other aspects and advantages will be described in detail with reference to the accompanying drawings, in which.

DETAILED DESCRIPTION

Figure 1:
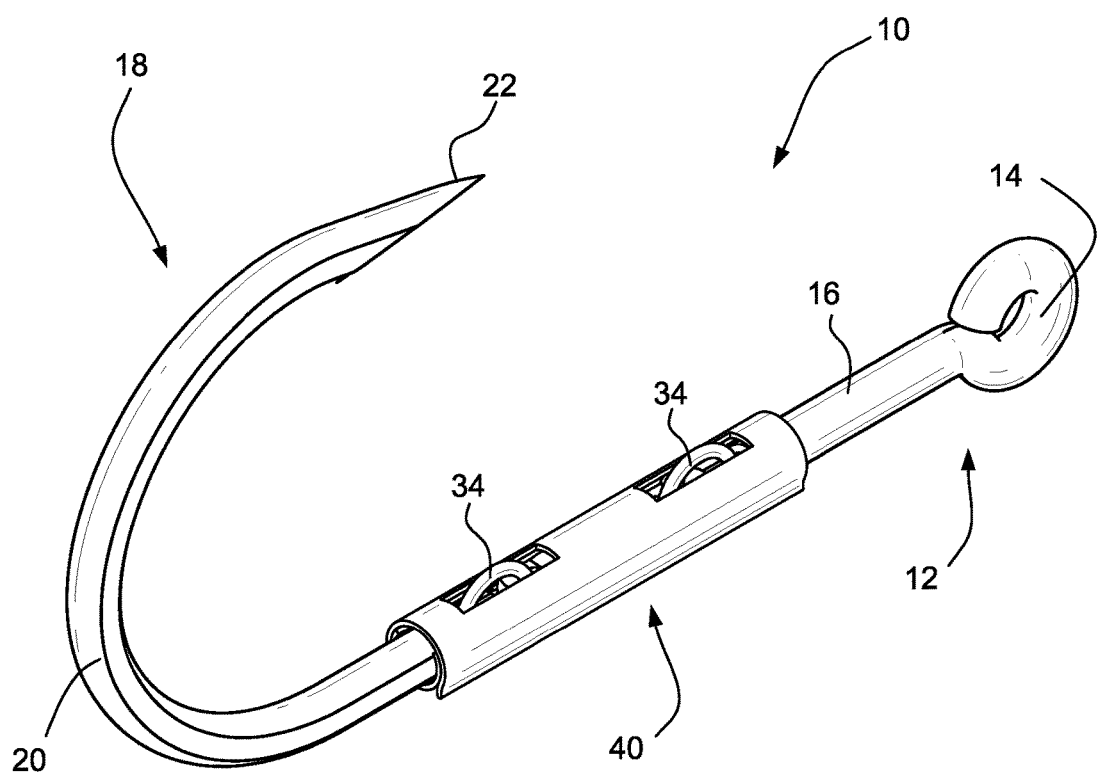
FIG. 1 is a perspective view of the fish hook according to preferred embodiments.

With reference to the drawings, a fish hook 10 is a multi-part assembly that is configured to break at a pivot point/swivel point if the lever force acting on the hook exceeds a preset force. The hook includes an eye section 12 including an eye 14 and a shank 16 and a hook section 18 including a bend 20 and a point 22. As with conventional fish hooks, the hook section 18 may also include a barb.

A universal pivot joint 24 connects the eye section 12 and the hook section 18 such that the hook section 18 is pivotable in multiple planes relative to the eye section 12. The universal pivot joint 24 may be constructed in any configuration that enables the hook section 18 to be pivotable in multiple planes relative to the eye section 12. In the exemplary embodiment shown in FIG. 3, the universal pivot joint 24 includes a connecting bar 26 with a hook end 28 that is pivotably connected to the hook section 18 and an eye end 30 that is pivotably connected to the eye section 12. Apertures 32 may be provided through each of the hook end 28 and the eye end 30 of the connecting bar 26, and connecting rings 34 may be disposed in each of the apertures 32 of the connecting bar 26. The eye section 12 and the hook section 18 may be provided with corresponding apertures 36 at ends thereof facing the connecting bar 26 to receive the connecting rings 34, respectively. Those of ordinary skill in the art will appreciate various alternatives to the connecting bar/connecting ring structure, and the invention is not necessarily meant to be limited to the exemplary embodiment shown in FIG. 3. For example, similar functionality may be achieved with a string or cord connected between the eye section 12 and the hook section 18. As another example, the ring and aperture connections may alternatively utilize a swivel-type connection/joint. The material of the fish hook 10 may also be such that the universal pivot joint 24 is achieved with a weakened section or the like. Still further, the structure could be achieved with a plastic heat shrink with a piece of wood stiffening up the breakaway portion.

Figure 2:
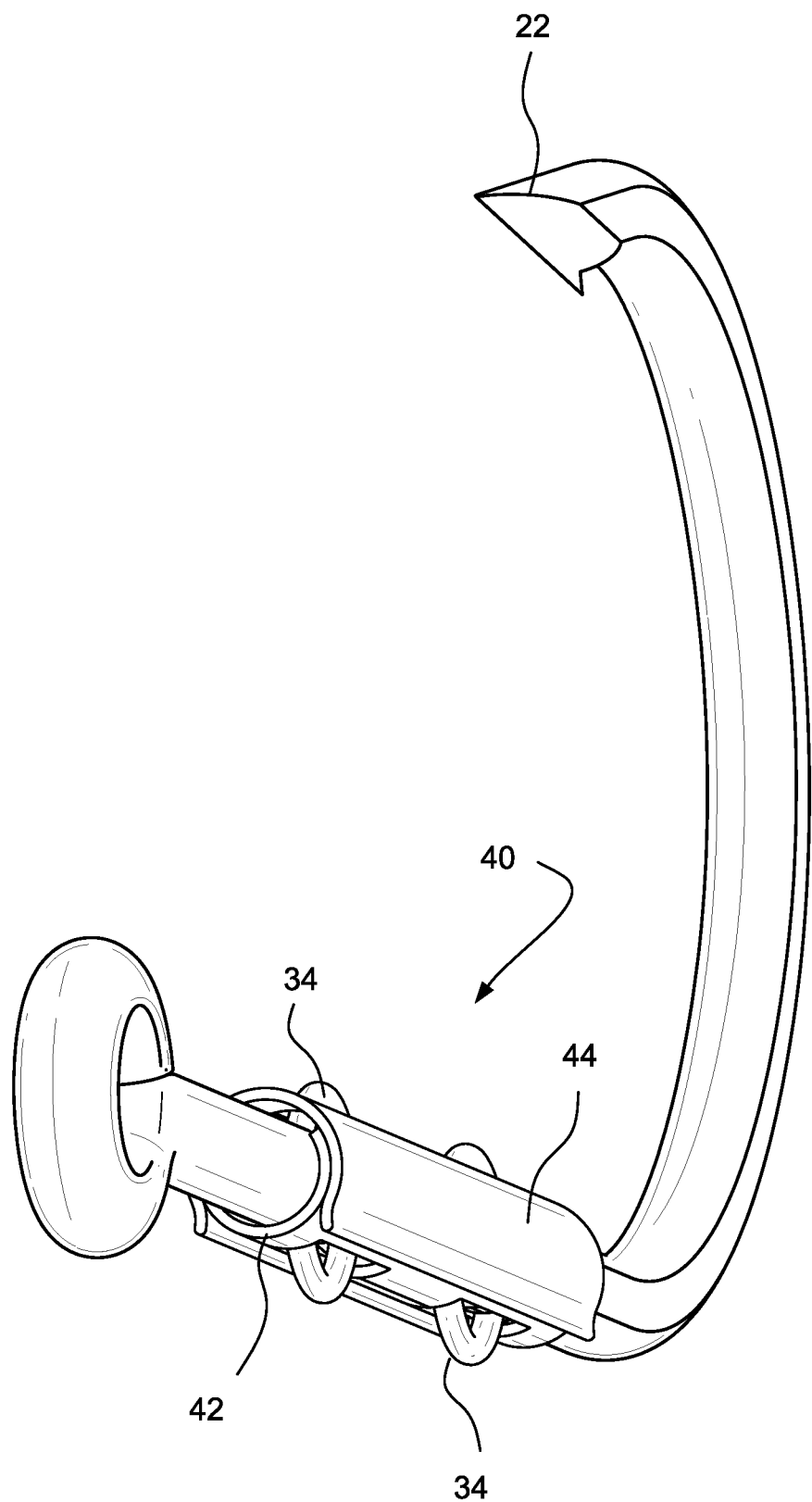
FIG. 2 is a close-up perspective view showing the breakaway clip engaged with the fish hook sections.
Figure 3:
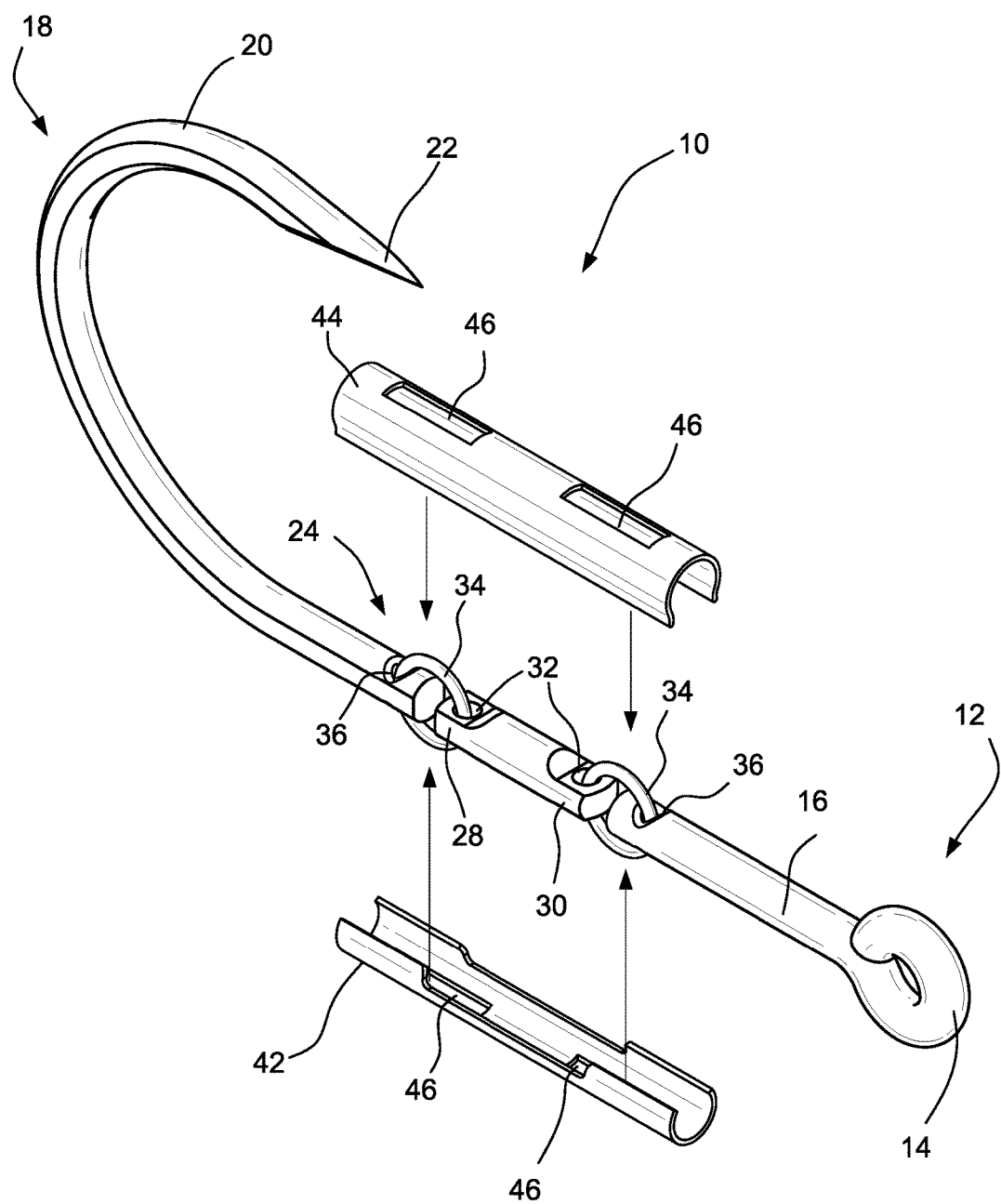
FIG. 3 shows the hook and breakaway clip with the breakaway clip separated from the hook.

A breakaway clip 40 acts between the eye section 12 and the hook section 18 to disable the universal pivot joint 24. That is, the breakaway clip 40 when attached prevents the hook section 18 from pivoting or swiveling etc. relative to the eye section 12. With reference to FIGS. 2 and 3, in an exemplary construction, the breakaway clip includes an inside piece 42 removably positionable over at least a portion of the eye section 12, the universal pivot joint 24, and at least a portion of the hook section 18. The breakaway clip 40 also includes an outside piece 44 that is releasably engageable with the inside piece 42. In one construction, the outside piece 44 engages the inside piece 42 in a snap fit. The inside 42 and outside 44 pieces of the breakaway clip 40 are shown with windows or slots 46 that when assembled receive the connecting rings 34. The slots 46 and connecting rings 34 facilitate alignment of the breakaway clip 40 during assembly.

In use, the breakaway clip 40 prevents the various sections 12, 24, 18 of the fish hook 10 from pivoting relative to one another up to a predetermined pivot force between the eye section 12 and the universal pivot joint 24 and/or between the hook section 18 and the universal pivot joint 24. The breakaway clip 40 is configured to separate from engagement with the fish hook 10 when the predetermined pivot force is exceeded. That is, as assembled, the fish hook 10 acts similar to a conventional hook. If a force from the fishing line acting on the hook 10 exceeds a preset force, the breakaway clip 40 is configured such that the inside piece 42 and outside piece 44 separate to release the pivot connections between the eye section 12, the universal pivot joint 24 and the hook section 18. When the breakaway clip 40 is separated, the amount of force on the hook shaft is reduced by reducing the size of the lever arm, and the orientation of the eye section 12 relative to the hook section 18 is such that a further pulling force on the eye section 12 by the fishing line will better drive the hook section 18 into the fish while reducing the likelihood that the hook will be detached from the fish. Since the ends of the universal pivot joint 24 enable the eye section 12 and the hook section 18 to be pivotable in multiple planes and since the eye section 12 and the hook section 18 are displaceable across at least 180°, the structure prevents binding regardless of a position of the fish relative to the line.

In some embodiments, the breakaway clip 40 may be formed of a biodegradable material. The breakaway clip 40 is configured to break at a preset force, for example, between 6-50 pounds or the like.

In assembling the fish hook 10, the eye section 12 and the hook section 18 are connected to opposite ends of the universal pivot joint 24 for example with the connecting rings 34. The universal pivot joint is then disabled by attaching the breakaway clip 40 across the eye section 12 and the hook section 18. The inside piece 42 of the breakaway clip 40 may be positioned first over at least a portion of the eye section 12, the universal pivot joint 24, and at least a portion of the hook section 18. The outside piece 44 may then be releasably engaged with the inside piece 42 in, for example, a snap fit. The windows 46 on each of the inside piece 42 and the outside piece 44 may be positioned over the connecting rings 34 to facilitate alignment.

The fish hook of the described embodiments provides for better fish retention once caught and also reduces the likelihood that a hook will be detached from a fish when reeling.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A fish hook comprising:
   an eye section including an eye and a shank;
   a hook section including a bend and a point;
   a universal pivot joint connecting the eye section and the hook section such that the hook section is pivotable in multiple planes relative to the eye section; and
   a breakaway clip acting between the eye section and the hook section and disabling the universal pivot joint.

2. A fish hook according to claim 1, wherein the breakaway clip comprises:
   an inside piece removably positionable over at least a portion of the eye section, the universal pivot joint, and at least a portion of the hook section, and
   an outside piece releasably engageable with the inside piece.

3. A fish hook according to claim 2, wherein the outside piece engages the inside piece in a snap fit.

4. A fish hook according to claim 1, wherein the universal pivot joint comprises a connecting bar including a hook end pivotably connected to the hook section and an eye end pivotably connected to the eye section.

5. A fish hook according to claim 4, wherein the universal pivot joint further comprises an aperture through each of the hook end and the eye end of the connecting bar, and a connecting ring disposed in each of the hook end aperture and the eye end aperture,
   wherein the eye section comprises a first aperture through an end thereof opposite the eye, wherein the hook section comprises a second aperture through an end thereof opposite the point, and
   wherein the connecting ring in the eye end aperture is disposed in the first aperture of the eye section, and the connecting ring in the hook end aperture is disposed in the second aperture of the hook section.

6. A fish hook according to claim 5, wherein the breakaway clip comprises:

an inside piece removably positionable over the connecting rings, at least a portion of the eye section, the universal pivot joint, and at least a portion of the hook section, and an outside piece positionable over the connecting rings and releasably engageable with the inside piece.

7. A fish hook comprising:

a first section, a middle section, and a last section, wherein the first section is pivotably connected to the middle section, and wherein the middle section is pivotably connected to the last section; and a breakaway clip acting across the first section, the middle section and the last section, the breakaway clip temporarily preventing the first, middle and last sections from pivoting relative to one another.

8. A fish hook according to claim 7, wherein the breakaway clip is configured to prevent the first, middle and last sections from pivoting relative to one another up to a predetermined pivot force between the first section and the middle section or between the middle section and the last section, and wherein the breakaway clip is configured to separate from the first, middle and last sections when the predetermined pivot force is exceeded.

9. A fish hook according to claim 8, wherein the breakaway clip comprises:

an inside piece removably positionable over at least a portion of the first section, the middle section, and at least a portion of the last section, and an outside piece releasably engageable with the inside piece.

10. A fish hook according to claim 9, wherein the outside piece engages the inside piece in a snap fit.

11. A fish hook according to claim 7, wherein the first section is connected to the middle section with a first connecting ring, and wherein the middle section is connected to the last section with a second connecting ring.

12. A fish hook according to claim 11, wherein the breakaway clip is positioned over the first and second connecting rings.

13. A method of assembling a fish hook comprising:

(a) connecting an eye section including an eye and a shank to one end of a universal pivot joint;

(b) connecting a hook section including a bend and a point to an opposite end of the universal pivot joint; and (c) disabling the universal pivot joint by attaching a breakaway clip across the eye section and the hook section.

14. A method according to claim 13, wherein the breakaway clip comprises an inside piece and an outside piece, and wherein step (c) comprises removably positioning the inside piece over at least a portion of the eye section, the universal pivot joint, and at least a portion of the hook section, and releasably engaging the outside piece with the inside piece.

15. A method according to claim 14, wherein the step of releasably engaging the outside piece with the inside piece comprises snapping the outside piece into engagement with the inside piece.

* * * * *